(12) United States Patent
Lee et al.

(10) Patent No.: US 10,272,944 B2
(45) Date of Patent: Apr. 30, 2019

(54) STEERING SYSTEMS AND METHODS FOR GENERATING HAPTIC FEEL TORQUE

(71) Applicant: GM GLOBAL TECHNOLOGY OPERATIONS LLC, Detroit, MI (US)

(72) Inventors: Jin-Woo Lee, Rochester Hills, MI (US); Bakhtiar B. Litkouhi, Washington, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 160 days.

(21) Appl. No.: 15/659,958

(22) Filed: Jul. 26, 2017

(65) Prior Publication Data
US 2019/0031235 A1    Jan. 31, 2019

(51) Int. Cl.
*B62D 5/00*    (2006.01)
*B62D 6/00*    (2006.01)
*B62D 15/02*   (2006.01)

(52) U.S. Cl.
CPC .............. *B62D 6/008* (2013.01); *B62D 5/006* (2013.01); *B62D 15/021* (2013.01)

(58) Field of Classification Search
CPC ...... B62D 6/008; B62D 5/006; B62D 15/021; B62D 5/005
See application file for complete search history.

(56) References Cited

U.S. PATENT DOCUMENTS 6,834,261 B1 * 12/2004 Andonian .............. B62D 5/006
                                                           273/442

* cited by examiner

*Primary Examiner* — Nicholas Kiswanto
(74) *Attorney, Agent, or Firm* — Lorenz & Kopf LLC

(57) ABSTRACT

Methods and systems for generating haptic feel torque for a steering system for an automotive vehicle are provided. In an exemplary embodiment, a method for generating haptic feel torque for a steering system for an automotive vehicle includes inputting a steering command signal by manipulating a steering wheel mounted to a steering column of the automotive vehicle. In response to the steering command, the method includes changing an orientation of road wheels of the automotive vehicle. Also, the method includes communicating condition data of the road wheels to a controller. Further, the method includes calculating with the controller a turning acceleration of the steering column in response to changing the orientation of the road wheels by modeling a virtual spring and a virtual damper interconnected between the steering column and the road wheels based on the condition data. The method also includes applying the turning acceleration to the steering column.

20 Claims, 3 Drawing Sheets

STEERING SYSTEMS AND METHODS FOR GENERATING HAPTIC FEEL TORQUE

INTRODUCTION

In a conventional automotive vehicle, steering is accomplished by adjusting the orientation of the front road wheels. The steering wheel is mechanically coupled to the road wheels through a rack and pinion mechanism wherein rotation of the steering wheel by the driver rotates a pinion to laterally displace a rack to change the orientation of the road wheels, i.e., pivot the road wheels left or right.

Systems that eliminate the mechanical coupling between the steering wheel and road wheels have been developed. For example, steer-by-wire (SBW) systems typically do not include a mechanical connection between the steering wheel and road wheels. Rather, such systems typically utilize an electric motor to drive an element, such as a pinion (in the case of pinion-mounted electric power assist motor) or a rack (in the case of a rack mounted electric power assist motor) to displace the element and change the road wheel orientation. Steering commands may be communicated from the steering wheel to the electric motor to direct change the road wheel orientation. Steering commands are typically inputted by a driver, or a control command in the case of automated steering, using a steering wheel similar to mechanical steering systems. Electrical sensors detect rotation of the steering wheel and provide a signal to a controller that actuates the electric motor to reorient the road wheels.

In a mechanical steering system, the driver experiences a steering feel, or haptic feedback, as a result of the mechanical linkage between the road wheels and the steering wheel. Steering feel facilitates proper control of the vehicle, thus it is desirable to provide such steering feel or haptic feedback in vehicles provided with steering systems in which the steering wheel is mechanically decoupled from the road wheels. Typically, steering feel may be provided in such systems through various methods, such as, in an exemplary case, through the use of an electric motor that coupled to the steering column through a belt and pulley mechanism. In response to rotation of the steering wheel to input a steering command, the controller actuates the electric motor coupled to the steering wheel to apply an opposite torque to the steering column and thereby provide a feeling of resistance to the driver. The degree of resistance is determined by the controller based upon applicable steering parameters including vehicle speed, steering wheel angle, steering wheel turn rate, yaw rate, rack load, suspension measurements, vertical acceleration, road type (if available), and lateral acceleration, and is intended to provide a feel similar to mechanical steering systems.

In order to emulate the steering feel of mechanical steering systems, non-mechanically coupled steering systems have typically utilized complicated modeling of steering and tire dynamics. Such modeling utilizes a large number of tuning parameters. Nevertheless, modeling the exact steering and tire dynamics may be difficult due to the large set of parameters and sensitivity to road disturbance and other factors.

Accordingly, it is desirable to provide methods for generating haptic feel torque for steering systems that avoid use of large sets of tuning parameters. Further, it is desirable to provide simplified methods for generating haptic feel torque for steering systems to emulate the steering feel of conventional mechanically-coupled steering systems. Furthermore, other desirable features and characteristics will become apparent from the subsequent detailed description and the appended claims, taken in conjunction with the accompanying drawings and the introduction.

SUMMARY

Methods and systems for generating haptic feel torque for a steering system for an automotive vehicle are provided. In an exemplary embodiment, a method for generating haptic feel torque for a steering system for an automotive vehicle includes inputting a steering command signal by manipulating a steering wheel mounted to a steering column of the automotive vehicle. In response to the steering command, the method includes changing an orientation of road wheels of the automotive vehicle. Also, the method includes communicating condition data of the road wheels to a controller. Further, the method includes calculating with the controller a turning acceleration of the steering column in response to changing the orientation of the road wheels and tire forces by modeling a virtual spring and a virtual damper interconnected between the steering column and the road wheels based on the condition data. The method also includes applying the turning acceleration to the steering column.

The vehicle in the exemplary method may include a steering angle sensor, a motor, and a road wheel sensor, and the method may further include identifying the steering command with the steering angle sensor, communicating the steering command from the steering angle sensor to the motor, wherein the motor changes the orientation of road wheels of the automotive vehicle, and obtaining the condition data of the road wheels with the road wheel sensor.

In an exemplary embodiment, the vehicle may include a haptic generator coupled to the steering column, and the haptic generator may be directed by the controller to apply the turning acceleration to the steering column. Further, the haptic generator may be coupled to the steering column via a mechanism, and the haptic generator may be directed by the controller to apply the turning acceleration to the steering column through the mechanism.

Also, calculating with the controller the turning acceleration of the steering column in response to changing the orientation of the road wheels by modeling the virtual spring and the virtual damper interconnected between the steering column and the road wheels based on the condition data may include calibrating a virtual spring constant and a virtual damping coefficient. For example, calculating with the controller the turning acceleration of the steering column in response to changing the orientation of the road wheels by modeling the virtual spring and the virtual damper interconnected between the steering column and the road wheels based on the condition data may include calibrating a virtual spring constant and a virtual damping coefficient to avoid steering wheel oscillation.

Calculating with the controller the turning acceleration of the steering column in response to changing the orientation of the road wheels by modeling the virtual spring and the virtual damper interconnected between the steering column and the road wheels based on the condition data may include calculating the turning acceleration, $\ddot{\theta}_{haptic}$, according to the equation:

$$\ddot{\theta}_{haptic} = -\frac{k_{vir}}{I_{upper}}(\theta_{target} - \theta_{lower} + \theta_{upper}) - \frac{c_{vir}}{I_{upper}}(\dot{\theta}_{lower} + \dot{\theta}_{upper})$$

wherein: $k_{vir}$ is a virtual spring constant; $c_{vir}$ is a virtual damping coefficient; $I_{upper}$ is steering column inertia; and each upper θ and each θ̇ is a measurement of the steering wheel or steering columns. Specifically, $θ_{target}$ is the commanded steering angle or angle of the steering wheel; θlower is the angle of the lower steering column; $θ_{upper}$ is the angle of the upper steering column; θ̇$_{lower}$ is the angular velocity of the lower steering column; and θ̇ upper is the angular velocity of the upper steering column.

The vehicle of the exemplary method may include a steering angle sensor and a road wheel sensor, and the method may include identifying the steering command with the steering angle sensor and obtaining the condition data of the road wheels with the road wheel sensor. For such an embodiment, calculating with the controller the turning acceleration of the steering column in response to changing the orientation of the road wheels by modeling the virtual spring and the virtual damper interconnected between the steering column and the road wheels based on the condition data may include calculating the turning acceleration, θ̈$_{haptic}$, according to the equation:

$$\ddot{θ}_{haptic} = -\frac{k_{vir}}{I_{upper}}(θ_{target} - θ_{lower} + θ_{upper}) - \frac{c_{vir}}{I_{upper}}(\dot{θ}_{lower} + \dot{θ}_{upper})$$

wherein:
$k_{vir}$ is a virtual spring constant;
$c_{vir}$ is a virtual damping coefficient;
$I_{upper}$ is steering column inertia;
$θ_{upper}$ is the angle of the upper steering column;
θ̇$_{upper}$ is the angular velocity of the upper steering column;
$θ_{lower}$ is the angle of the lower steering column; and
θ̇$_{lower}$ is the angular velocity of the lower steering column.

In another embodiment, a method for generating haptic feel torque for a steering system for an automotive vehicle includes inputting a steering command signal by manipulating a steering wheel mounted to a steering column of the automotive vehicle. In response to the steering command, the method includes changing an orientation of road wheels of the automotive vehicle. The method also includes communicating condition data of the road wheels to a controller. The method further includes calculating with the controller a turning acceleration of the steering column in response to changing the orientation of the road wheels by modeling system components from standard steering tests and by estimating selected parameters of the steering system. Also, the method includes applying the turning acceleration to the steering column.

The vehicle in the exemplary method may include a steering angle sensor, a motor, and a road wheel sensor, and the method may further include identifying the steering command with the steering angle sensor, communicating the steering command from the steering angle sensor to the motor, wherein the motor changes the orientation of road wheels of the automotive vehicle, and obtaining the condition data of the road wheels with the road wheel sensor.

In an exemplary embodiment, the vehicle may include a haptic generator coupled to the steering column, and the haptic generator may be directed by the controller to apply the turning acceleration to the steering column. Further, the haptic generator may be coupled to the steering column via a mechanism, such as a belt and pulley mechanism in an exemplary case, and the haptic generator may be directed by the controller to apply the turning acceleration to the steering column through the mechanism.

In an exemplary embodiment, the selected parameters of the steering system include $I_{equ}$, $c_{equ}$ and $k_{equ}$. In another exemplary embodiment, the selected parameters are estimated by approximating the selected parameters in a second order equivalent system. In another exemplary embodiment, the selected parameters are approximated in the equation:

$$T_{haptic} = I_{equ}\ddot{θ} + c_{equ}\dot{θ} + k_{equ}θ + T_{EPS} + T_{SelfAlign}$$

wherein $T_{haptic}$ is the calculated steering column torque, and $I_{equ}$, $c_{equ}$ and $k_{equ}$ are determined from experimental data sets. $T_{EPS}$ is the measurement torque from the EPS motor. $T_{SelfAlign}$ is steering wheel's self aligning torque. It is a function of vehicle speed, steering angle, and tire dynamic parameters. For parameter estimation purposes, $T_{SelfAlign}$ is determined and pre-recorded from vehicle tests in various conditions.

In another exemplary embodiment, the selected parameters are approximated in the equation:

$$T_{haptic} = I_{equ}\ddot{θ} + c_{equ}\dot{θ} + k_{equ}θ + T_{EPS} + T_{SelfAlign}$$

wherein $T_{haptic}$ is the calculated steering column torque, and $I_{equ}$, $c_{equ}$ and $k_{equ}$ are determined from experimental data sets; and wherein θ, θ̇, and θ̈ are measurements of the steering wheel. Specifically, θ is the steering wheel angular position; θ̇ is the steering wheel angular velocity; and θ̈ is the steering wheel angular acceleration.

Further, in an exemplary embodiment, the method uses a first equation for calculating the turning acceleration of the steering column at low speeds and uses a second equation for calculating the turning acceleration of the steering column at high speeds.

In another embodiment, a steering system is provided for an automotive vehicle that includes road wheels and an element mechanically coupled to the road wheels and displaceable to change an orientation of the road wheels. The exemplary steering system includes a steering wheel mounted on a steering column and rotatable for inputting a steering command, a steering angle sensor for identifying the steering command, a motor for displacing the element to change the orientation of the road wheels, a road wheel sensor for obtaining road wheel condition data, a haptic generator coupled to the steering column for applying a turning acceleration thereto, and a controller for receiving the steering command data and the road wheel condition data and for calculating the turning acceleration to be applied to the steering column by modeling a virtual spring and a virtual damper interconnected between the steering column and the road wheels based on the condition data or by modeling system components from standard steering tests and by estimating selected parameters of the steering system.

BRIEF DESCRIPTION OF THE DRAWINGS

The present subject matter will hereinafter be described in conjunction with the following drawing figures, wherein like numerals denote like elements, and wherein.

DETAILED DESCRIPTION

Figure 1:
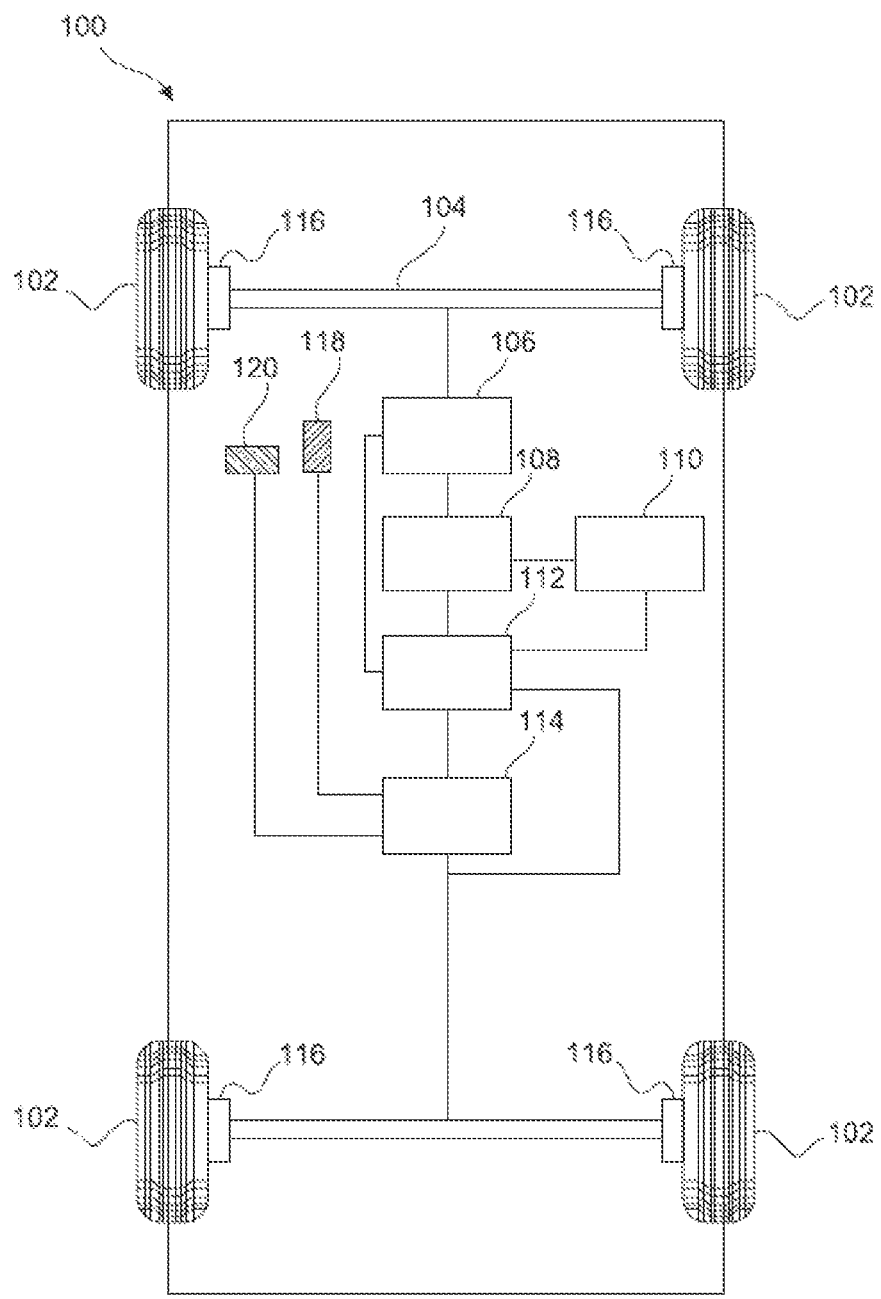
FIG. 1 is a schematic representation of an exemplary embodiment of a vehicle having a steering system.

The following detailed description is merely exemplary in nature and is not intended to limit the subject matter claimed herein. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description. Furthermore, there is no intention to be bound by any theory presented in the preceding background or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

For the sake of brevity, conventional techniques related to vehicle design, vehicle control systems, steering systems, electric and hybrid electric drivetrains, vehicle-based electronic control units (ECUs), and vehicle-based networking protocols and related architectures may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Embodiments herein provide methods for generating an emulated haptic feel torque for steering systems, such as steer-by-wire (SBW) systems. In such steering systems, the steering wheel is mechanically decoupled from the road wheels. When mechanically coupled in conventional systems, rotational torque from the road wheels, or haptic feel torque, is communicated to the steering wheel through the mechanical connection therebetween. Therefore, embodiments herein seek to recreate the haptic feel torque of mechanically coupled steering systems for mechanically decoupled steering systems.

Embodiments herein generate haptic feel torque for the steering wheel without complicated modeling of the steering and tire dynamics. Most conventional haptic feel torque generation systems generate haptic feel torque corresponding to steering and tire dynamics modeling. However, modeling the exact steering and tire dynamics is not practically possible due to the large sets of tuning parameters and sensitivity to road disturbance and other varied factors. Unlike conventional systems, embodiments herein provide intuitive tuning methods that utilize only a few tuning parameters that are equivalent to inertia, compliance, and a damping coefficient. The utilized tuning parameters can be easily tuned without a deep understanding of the system dynamics. Further, embodiments herein provide a unified steering feel emulation for a plurality of steering feels, such as returnability, end-stop, variable steering torque. Embodiments herein provide for driver adaptation capability with different steering feel emulation modes, such as variable desired levels of smooth or tight steering feel.

In one embodiment, a method for generating haptic feel torque models haptic feel torque as if the steering column were physically connected to the lower column through a virtual spring and a virtual damper. Such a method therefore, provides for use of a virtual spring constant and a virtual damper coefficient to calculate a steering column turning acceleration in view of given steering wheel angle and road wheel angle measurements.

In another embodiment, a method for generating haptic feel torque models haptic feel torque as if the steering column were physically connected to the lower column through utilization of system components modeled from standard steering tests and of selected parameters estimated from the standard steering tests.

FIG. 1 is a schematic representation of an exemplary embodiment of a vehicle 100 having a steering system. While, the illustrated vehicle 100 may be outfitted for electric operation, steering systems for combustion vehicles are also contemplated. The vehicle 100 may be a front-wheel drive vehicle, a rear-wheel drive vehicle, an all-wheel drive vehicle, or the like. The non-limiting embodiment illustrated in FIG. 1 represents a front-wheel drive vehicle. The vehicle 100 may include, without limitation: road wheels 102; at least one drive axle 104; a drive system 106; an electric motor/generator (MOGEN) 108; an energy storage system (ESS) 110 for the drive system 106; a computer or processor based control system 112; a number of vehicle sensors 114; a friction braking system 116; an accelerator pedal 118; and a brake pedal 120. The steering system of the vehicle 100 may be implemented or realized as a combination of various hardware, control, and computer-executable code elements onboard the vehicle 100. For example, the steering system may include or cooperate with some or all of the following, without limitation: one or more drive axles 104, the drive system 106, the electric motor 108, the control system 112, one or more of the sensors 114, and the friction braking system 116.

FIG. 1 depicts the vehicle 100 in a very simplified manner. It should be appreciated that a practical embodiment of the vehicle 100 will include many additional components, subsystems, and elements that cooperate to provide a variety of conventional and ordinary features and functions. For the sake of brevity and clarity, conventional aspects of the vehicle 100 (which may be unimportant or unrelated to the disclosed subject matter) will not be described in detail here.

The drive system 106 delivers traction power to the drive axle(s) 104. The drive system 106 may include, without limitation, a transmission, a torque converter, and an internal combustion engine (for HEV or plug-in HEV vehicles). For ease of illustration, these components are not depicted in FIG. 1. The drive system 106 is suitably designed and controlled to cooperate with the motor 108 and the ESS 110 such that the road wheels 102 (e.g., the front drive wheels for this example) can be driven by the motor 108 using electric energy stored in the ESS 110. The motor 108, the ESS 110, and/or other features and functions of the vehicle 100 are controlled by the control system 112.

The control system 112, which may be implemented using one or more onboard electronic control modules, is suitably configured to operate as a regenerative control system for the vehicle 100. In certain embodiments, the functionality of the control system 112 is distributed among a plurality of physically distinct electronic control modules of the vehicle 100. For example, the control system 112 may include or cooperate with one or more of the following, without limitation: a central control module; an engine control module; a transmission control module; a power inverter module; a braking control module; a body control module; a powertrain control module; and a battery control module. These, and possibly other, modules include the control logic and functional capabilities as might be necessary to operate the vehicle 100 in the desired manner. If so configured, the control system 112 can provide overarching control and coordination of some or all of the aforementioned modules. For simplicity, the control system 112 is represented as a single block, although separate distinct components may also be deployed in an embodiment of the vehicle 100. In certain embodiments, the control system 112 can be configured to provide or support some or all of the functionality of the instrument display system described in more detail below.

The control system 112 (and any individual control module onboard the vehicle 100) can be configured as a general purpose digital computer generally including a microprocessor, a central processing unit, or other form of processor device, read only memory (ROM), random access memory (RAM), electrically-programmable read only memory (EPROM), high speed clock, analog to digital (A/D) and digital to analog (D/A) circuitry, and input/output circuitry and devices (I/O), as well as appropriate signal conditioning and buffer circuitry. Each set of algorithms resident in the control system 112 (and any individual control module onboard the vehicle 100) or accessible thereby may be stored in ROM and executed as needed to implement the respective functions.

The ESS 110 can be configured as one or more batteries, although other electrical and/or electrochemical energy storage devices having the ability to store electric power and dispense the electric power can be used here. The ESS 110 can be sized based on factors including regenerative braking requirements, application issues related to typical road grade and temperature, and propulsion requirements such as emissions, power assistance, and electric range. Generally, the ESS 110 is a relatively high-voltage direct current (DC) device coupled to a transmission power inverter module (not shown) via sufficiently constructed and routed DC cabling, as will be understood by those of ordinary skill in the art.

The electric motor 108 is mechanically coupled to at least one of the road wheels 102, and is electrically coupled to the ESS 110. The electric motor 108 can operate alternately as a power supplier or as a power generator. When operating as an electric motor or a power supplier, the motor 108, which may be a single unit or multiple units depending on the design of the vehicle 100, supplies power to the drive system 106. When operating as a generator, the motor 108 will receive electrical power from the drive system 106. In this regard, the control system 112 is adapted to route or distribute electrical energy from the motor 108 to the ESS 110 to recharge the ESS 110, and/or to distribute the electrical energy from the ESS 110 to another electrical power unit (not shown), which will be operating as an electric motor at that time.

The vehicle 100 includes a conventional electromechanical or hydraulic friction braking system 116, which utilizes a fluid-actuated pad and/or drum style brake mechanism positioned in proximity to each road wheel 102. The friction braking system 116 provides a frictional braking torque, which can be augmented by an electronic/regenerative braking torque. When a driver or operator of the vehicle 100 depresses a brake pedal 120 to thereby input a force and travel describing a driver-commanded overall braking torque, the friction braking system 116 slows the vehicle 100 via a combination of the friction braking torque and the regenerative braking torque (if available).

Still referring to FIG. 1, the vehicle 100 is also equipped with various sensors 114 that detect or obtain information (referred to herein as vehicle status data) related to the current operating state or condition of the vehicle 100. For example, the sensors 114 may include wheel speed sensors that measure wheel speed and wheel slip data (the vehicle speed, acceleration, and deceleration can be calculated by the control system 112 using the wheel speed data). The sensors 114 may also include sensors that detect the position and/or travel of the brake pedal 120 and the accelerator pedal 118. The sensors 114 may also include sensors that determine the current state of charge of the ESS 110, the charge and/or discharge power of the ESS 110 at any given time, and the temperature of the ESS 110 at any given time. During operation of the vehicle 100, the control system 112 receives real-time vehicle status data by way of input signals corresponding to the different sensors 114, which may be deployed at various locations onboard the vehicle 100. The sensor data can be gathered and processed at any sampling rate, e.g., once every 10 milliseconds.

Figure 2:
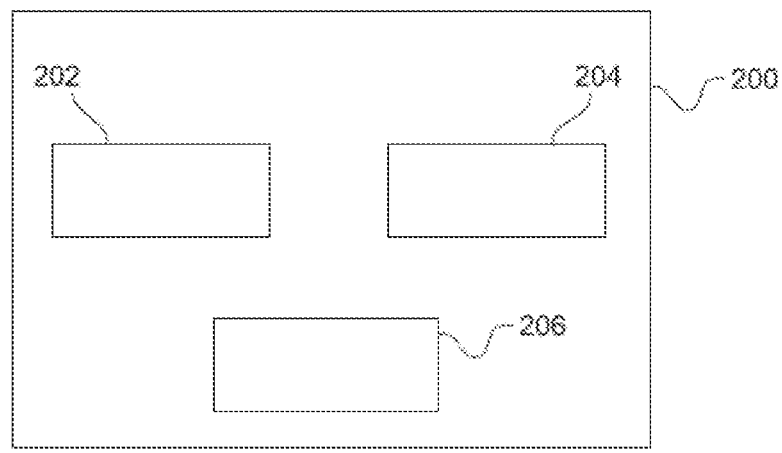
FIG. 2 is a block diagram representation of an embodiment of an electronic control unit suitable for use in a vehicle.

As mentioned previously, the control system 112 and other functional modules of the vehicle 100 can be implemented using one or more ECUs. For example, the vehicle 100 can include any or all of the following ECUs, without limitation: body control module; center stack module; memory seat module; instrument panel cluster module; rear seat entertainment module; lift gate module; amplifier module; transmission module; climate control (HVAC) module; and engine control module. In this context, FIG. 2 is a block diagram representation of an embodiment of an ECU 200 suitable for use in the vehicle 100. Although one ECU 200 can manage the instrumentation and display functionality described herein, various embodiments may employ a plurality of ECUs 200 to support the functionality in a cooperative and distributed manner. The illustrated embodiment of the ECU 200 generally includes, without limitation: at least one processor device 202; at least one computer-readable memory device or storage medium 204; and an input/output module 206 (e.g., a suitably configured transceiver). In practice, the ECU 200 may include additional elements, devices, and functional modules that cooperate to achieve the desired functionality.

The processor device 202 is capable of executing computer executable instructions stored on the storage medium 204, wherein the instructions cause the ECU 200 to perform the various processes, operations, and functions for which it is responsible. In practice, the processor device 202 may be implemented as a microprocessor, a number of discrete processor devices, content addressable memory, an application specific integrated circuit, a field programmable gate array, any suitable programmable logic device, discrete gate or transistor logic, discrete hardware components, or any combination designed to perform the desired functions.

The storage medium 204 (and/or any general purpose memory storage device or storage element) may be utilized to store program code that defines an operating system, a boot loader, or a BIOS for the ECU 200. Moreover, the storage medium 204 may include random access memory that serves as temporary data storage for the processor device 202. In this regard, the processor device 202 can write to and read from the storage medium 204 as needed to support the operation of the ECU 200.

The input/output module 206 may be realized using software, firmware, hardware, processing logic, or any suitable combination thereof. In certain exemplary embodiments, the input/output module 206 is suitably configured to support data communication between the ECU 200 and other modules, ECUs, sensors, or devices onboard the host vehicle 100. The input/output module 206 may also be designed to support data communication with external devices or sources. For example, can be used to receive output data from "external" sensors that are not otherwise coupled to the communication network onboard the vehicle 100.

Figure 3:
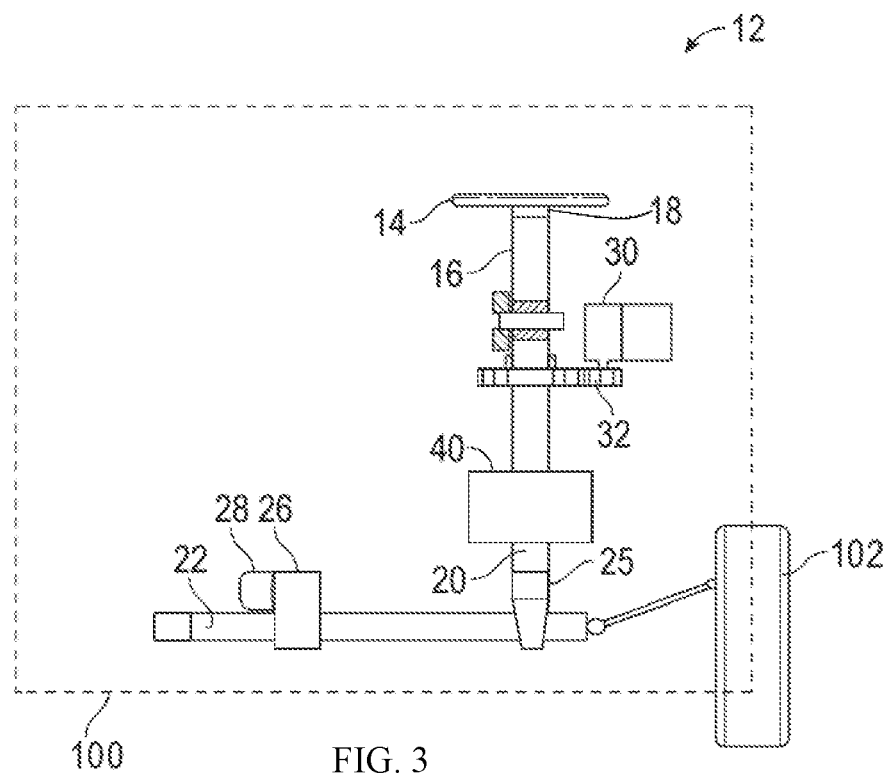
FIG. 3 is a schematic diagram of an automotive vehicle provided with a steering system in accordance with embodiments herein.

FIG. 3 is a further schematic diagram illustrating the automotive vehicle 100 provided with a steering system 12 capable of selectively operating in a steer-by-wire (SBW) mode or in an electric power steering (EPS) mode. As shown, the vehicle 100 includes a steering wheel 14 mounted on a steering column 16 and rotatable, such as by a driver or a control command in the case of automated steering, for inputting a steering command. Further, the vehicle 100 includes an angle sensor 18 configured to measure an angle, rotational velocity and/or rotational acceleration of the steering wheel 14. Angle sensor 18 is included among the vehicle sensors 114 of FIG. 1. The angle sensor 18 may include a transceiver for communicating the angle, rotational velocity and/or rotational acceleration of the steering wheel 14 as the steering command.

As further shown, the exemplary vehicle 100 includes a lower column 20 coupled to an element 22, such as a rack, that is mechanically coupled to the road wheels 102 and that is laterally displaceable to change an orientation of the road wheels 102. The vehicle 100 may further include a road wheel sensor 25 that senses the orientation or angle and rotational velocity or acceleration of the road wheels 102 and that may provide a road wheel signal indicative of a road wheel orientation, velocity and acceleration. Road wheel sensor 25 is included among the vehicle sensors 114 of FIG. 1. The road wheel sensor 25 may include a transceiver for communicating the orientation, velocity and acceleration of the road wheels 102 as a signal in response to a steering command.

Also, the exemplary vehicle 100 includes a motor 26 coupled to the element 22 for laterally displacing the element 22 in response to the steering command. A controller 28 independent of, or integrated into, the motor 26 may be provided to receive the steering command signal from the angle sensor 18.

As further illustrated, the exemplary vehicle 100 includes an electric motor or haptic generator 30 that is mechanically coupled to the steering column 16 by a belt and pulley mechanism 32. An exemplary haptic generator 30 includes a controller for receiving the road wheel signal from the road wheel sensor 25 and for directing the haptic generator 30 to apply a haptic feel torque to the steering column 16 indicative of the torque of the road wheels 102.

In FIG. 3, the steering column 16 is not mechanically coupled to the lower column 20. Rather, a virtual spring and a virtual damper are illustrated as virtual box 40 for providing a virtual connection, i.e., non-mechanical connection, between the steering column 16 and the lower column 20. In order to generate haptic feel torque on the steering column 16 and steering wheel 14, the haptic actuator 30 calculates the haptic feel torque based on spring and damper parameters.

For example, the method utilizes the haptic actuator 30 to generate steering haptic feel torque to emulate mechanical connection between the steering column 16 and the lower column 20. The haptic actuator 30 applies haptic feel torque, i.e., applies a rotational torque, to the steering column 16 as if the steering column 16 were physically connected to the lower column 20 through a spring and damper system, modeled by virtual box 40.

For example, the haptic actuator generates the steering column turning acceleration, $\ddot{\theta}_{haptic}$, according to the equation:

$$\ddot{\theta}_{haptic} = -\frac{k_{vir}}{I_{upper}}(\theta_{target} - \theta_{lower} + \theta_{upper}) - \frac{c_{vir}}{I_{upper}}(\dot{\theta}_{lower} + \dot{\theta}_{upper})$$

wherein tuning variable $k_{vir}$ is a virtual spring constant, and tuning variable $c_{vir}$ is a virtual damping coefficient. Further, $I_{upper}$ is the steering column inertia, which is a known parameter. Also, each $\theta$ and $\dot{\theta}$ is a measurement of the steering wheel or steering columns.

Specifically, $\theta_{lower}$ is the angle of the lower steering column; $\theta_{upper}$ is the angle of the upper steering column; $\theta_{target}$ is the commanded steering angle, i.e., the driver's steering input or a target control command for automated steering; $\dot{\theta}_{lower}$ is the angular velocity of the lower steering column; and $\dot{\theta}_{upper}$ is the angular velocity of the upper steering column. For the equation, the virtual spring constant, $k_{vir}$, and the virtual damping coefficient, $c_{vir}$, are calibrated as the critically damped system or overdamped system. As a result, steering wheel oscillation may be avoided.

Thus, the equation that models a virtual spring and virtual damper arrangement utilizes only two tuning variables: virtual spring constant $k_{vir}$ and virtual damping coefficient $c_{vir}$, and utilizes a known (for any given vehicle) parameter of steering column inertia $I_{upper}$. Further, the equation that models a virtual spring and virtual damper arrangement measures only five changing real time conditions: the upper steering column angle position $\theta_{upper}$; the lower steering column angle position of the $\theta_{lower}$; the commanded steering angle $\theta_{target}$; the rotational velocity of the upper steering column $\dot{\theta}_{upper}$; and the rotational velocity of the lower steering column $\dot{\theta}_{lower}$.

Nevertheless, with only two tuning variables, a known parameter, and five measured conditions, the equation generates a steering column turning acceleration that emulates a conventional system in which the steering wheel is mechanically coupled to the road wheels. Further, the equation provides for easy modification to emulate desired driving conditions, such as a tight steering feel or smooth steering feel, by adjusting one or both of the tuning variables, i.e., the virtual spring constant $k_{vir}$ and/or the virtual damping coefficient $c_{vir}$.

In another embodiment, the box 40 is utilizes as a virtual dynamics box to emulate a direct mechanical connection between the steering column 16 and the lower column 20.

For example, an algorithm emulates the known dynamics of the mechanical components of conventional steering systems. Conventional steering systems have many mechanical components (gear assembly, joints, torsion bar, tire, motor, and the like) that create compliance, damping, and non-linearity along the steering column 16. In an exemplary embodiment, these components are modeled from the system identification. Further, other selected parameters are estimated.

In this embodiment, the equation for emulating haptic feel torque uses the known dynamics of conventional steering system mechanical components. Unmodeled dynamics are approximated as a second order equivalent system, such as in the equation:

$$T_{haptic}=I_{equ}\ddot{\theta}+c_{equ}\dot{\theta}+k_{equ}\theta+T_{ESP}+T_{SelfAlign}$$

Wherein $T_{haptic}$ is the calculated steering column torque, and $I_{equ}$, $c_{equ}$ and $k_{equ}$ are determined from experimental data sets. For parameter estimation of the steering system, large data sets are collected from a set of standard steering tests which can measure $\theta$, $\dot{\theta}$, $\ddot{\theta}$, $v_x$, and $T_{haptic}$. A curve fitting method may then be applied to find $I_{equ}$, $c_{equ}$ and $k_{equ}$. $T_{SelfAlign}$ is an estimated torque value that may be determined and pre-recorded based on testing and can be provide in the form of a look up table from the prior testing. $T_{EPS}$ is measured. The equivalent dynamic model can be adjusted to match vehicle design concept and driver preference. For example, $I_{equ}$ can be increased to emulate a heavy steering feel, $k_{equ}$ can be increased to emulate quick responsiveness, and $c_{equ}$ can be increased to emulate a smooth steering feel. After the equivalent model is found, the haptic actuator generates the steering column torque, $T_{haptic}$.

Further, in this embodiment, the equivalent model can be separated into different equations that are dependent on vehicle speed. For example, at lower speeds, tire properties exhibit more influence on steering feel. Thus, constants in the equation may be changed based on vehicle speed. In an exemplary embodiment, a low speed equation is:

$$T_{haptic}=I_{low}\ddot{\theta}+c_{low}\dot{\theta}+k_{low}\theta+T_{ESP}+T_{SelfAlign}$$

A high speed equation is:

$$T_{haptic}=I_{hg}\ddot{\theta}+c_{hg}\dot{\theta}+k_{hg}\theta+T_{ESP}+T_{SelfAlign}$$

Haptic feel generation can be further improved by adding road surface information, such as road cross slope, road construction material (i.e., concrete, asphalt, gravel, etc.), road condition (i.e., wet, icy, etc.), from map and surface detection modules provided elsewhere in the vehicle. Also, sensors in the suspension system, such as height sensors, in the tires, such as pressure sensors, and wheel speed sensors can be utilized to improve the emulated steering feel.

Figure 4:
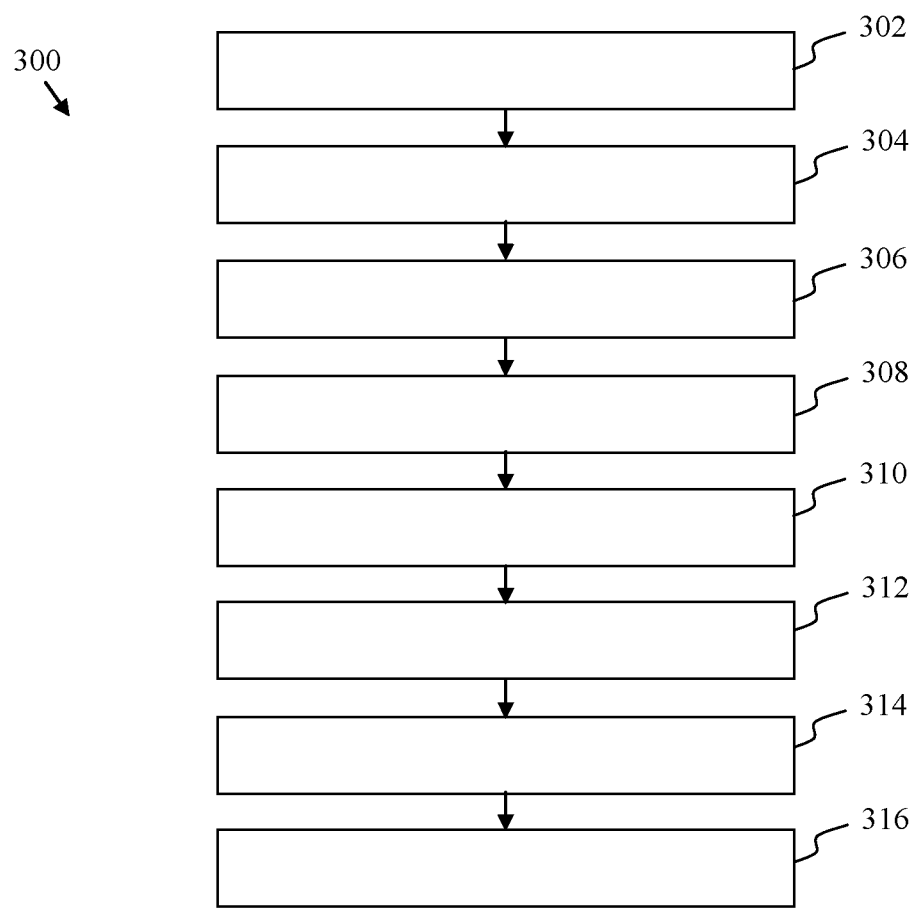
FIG. 4 is a flow chart that illustrates an exemplary embodiment of a method for generating haptic feel torque for a steering system for an automotive vehicle.

FIG. 4 is a flow chart that illustrates an exemplary embodiment of a vehicle steering method 300. The method 300 can be performed to control the vehicle with selected haptic steering feel torque provided to the steering wheel. The method 300 may include inputting a steering command signal at action 302. For example, a driver or control command may manipulate a steering wheel mounted to a steering column of the automotive vehicle to a desired angle.

The method 300 further includes receiving steering wheel data at action 304. For example, a steering wheel sensor may identify the angle of the steering wheel, the rotational velocity of the steering wheel, the rotational acceleration of the steering wheel, or other selected data.

At action 306, the method includes communicating the steering wheel data. In an exemplary embodiment, the steering wheel sensor, or a controller coupled thereto, may communicate the steering wheel data to a motor, or motor controller, coupled to the road wheels.

The method 300 includes changing the orientation of the road wheels at action 308 in response to receiving the steering wheel data. In an exemplary embodiment, a motor laterally displaces an element mechanically coupled to the road wheels to change the orientation of the road wheels.

Further, the method 300 includes obtaining road wheel condition data at action 310. For example, a road wheel sensor may monitor various properties of the road wheels, and of the vehicle, such as road wheel angle orientation, angular velocity, angular acceleration, vehicle speed, rack load, and the like.

At action 312, the road wheel data is communicated. Specifically, the road wheel data is communicated from the road wheel sensor, or from a controller coupled thereto, to a steering system controller.

The steering system controller then utilizes the steering wheel data and the road wheel data to calculate an appropriate turning acceleration to apply to the steering column at action 314. Such a calculation may be performed using a virtual spring and virtual damper calculation or using a calculation for emulating the known dynamics of the mechanical components of conventional steering systems, as described above.

The method 300 applying the turning acceleration to the steering column at action 316. For example, a haptic generator coupled to the steering column may be directed by the controller to apply the calculated turning acceleration to the steering column.

After action 302, the various tasks performed in connection with the method 300 may be performed by software, hardware, firmware, or any combination thereof. For illustrative purposes, the following description of the method 300 may refer to elements mentioned above in connection with FIGS. 1-3. It should be appreciated that the method 300 may include any number of additional or alternative tasks, the tasks shown in FIG. 4 need not be performed in the illustrated order, and the method 300 may be incorporated into a more comprehensive procedure or process having additional functionality not described in detail herein. Moreover, one or more of the tasks shown in FIG. 4 could be omitted from an embodiment of the method 300 as long as the intended overall functionality remains intact.

As described herein, methods are provided for generating haptic feel torque for a steering system for an automotive vehicle. The methods described herein avoid use of complicated modeling of steering and tire dynamics. Rather, the methods described herein provide for emulation through a virtual spring and virtual damper system, or through selective modeling and estimation of tuning parameters. As a result, methods for generating haptic feel torque for a steering system for an automotive vehicle are simplified, ease tuning for driver preferences, while still emulating mechanically-coupled steering systems.

While at least one exemplary aspect has been presented in the foregoing detailed description, it should be appreciated that a vast number of variations exist. It should also be appreciated that the exemplary aspect or exemplary aspects are only examples, and are not intended to limit the scope, applicability, or configuration of the claimed subject matter in any way. Rather, the foregoing detailed description will provide those skilled in the art with a convenient road map for implementing an exemplary aspect of the subject matter. It being understood that various changes may be made in the function and arrangement of elements described in an exemplary aspect without departing from the scope of the subject matter as set forth in the appended claims.

What is claimed is:

1. A method for generating haptic feel torque for a steering system for an automotive vehicle, the method comprising:
inputting a steering command signal by manipulating a steering wheel mounted to a steering column of the automotive vehicle;
in response to the steering command, changing an orientation of road wheels of the automotive vehicle;
communicating condition data of the road wheels to a controller;
calculating with the controller a turning acceleration of the steering column in response to changing the orientation of the road wheels by modeling a virtual spring and a virtual damper interconnected between the steering column and the road wheels based on the condition data; and
applying the turning acceleration to the steering column.

2. The method of claim 1 wherein the vehicle includes a steering angle sensor, a motor, and a road wheel sensor, and wherein the method comprises:
identifying the steering command with the steering angle sensor;
communicating the steering command from the steering angle sensor to the motor, wherein the motor changes the orientation of road wheels of the automotive vehicle; and
obtaining the condition data of the road wheels with the road wheel sensor.

3. The method of claim 1 wherein the vehicle includes a haptic generator coupled to the steering column, wherein the haptic generator is directed by the controller to apply the turning acceleration to the steering column.

4. The method of claim 1 wherein the vehicle includes a haptic generator coupled to the steering column via a mechanism, wherein the haptic generator is directed by the controller to apply the turning acceleration to the steering column through the mechanism.

5. The method of claim 1 wherein calculating with the controller the turning acceleration of the steering column in response to changing the orientation of the road wheels by modeling the virtual spring and the virtual damper interconnected between the steering column and the road wheels based on the condition data comprises calibrating a virtual spring constant and a virtual damping coefficient.

6. The method of claim 1 wherein calculating with the controller the turning acceleration of the steering column in response to changing the orientation of the road wheels by modeling the virtual spring and the virtual damper interconnected between the steering column and the road wheels based on the condition data comprises calibrating a virtual spring constant and a virtual damping coefficient.

7. The method of claim 1 wherein calculating with the controller the turning acceleration of the steering column in response to changing the orientation of the road wheels by modeling the virtual spring and the virtual damper interconnected between the steering column and the road wheels based on the condition data comprises calculating the turning acceleration, $\ddot{\theta}_{haptic}$, according to the equation:

$$\ddot{\theta}_{haptic} = -\frac{k_{vir}}{I_{upper}}(\theta_{target} - \theta_{lower} + \theta_{upper}) - \frac{c_{vir}}{I_{upper}}(\dot{\theta}_{lower} + \dot{\theta}_{upper})$$

wherein:
$k_{vir}$ is a virtual spring constant; $c_{vir}$ is a virtual damping coefficient;
$I_{upper}$ is steering column inertia; and $\theta_{upper}$ is the angle of the upper steering column;
$\theta_{lower}$ is the angle of the lower steering column; $\theta_{target}$ is the commanded steering angle;
$\dot{\theta}_{lower}$ is the angular velocity of the lower steering column; and $\dot{\theta}_{upper}$ is the angular velocity of the upper steering column.

8. The method of claim 1 wherein the vehicle includes a steering angle and/or angle rate sensor and a road wheel sensor, and wherein the method comprises:
identifying the steering command with the steering angle sensor; and
obtaining the condition data of the road wheels with the road wheel sensor; wherein calculating with the controller the turning acceleration of the steering column in response to changing the orientation of the road wheels by modeling the virtual spring and the virtual damper interconnected between the steering column and the road wheels based on the condition data comprises calculating the turning acceleration, $\ddot{\theta}_{haptic}$, according to the equation:

$$\ddot{\theta}_{haptic} = -\frac{k_{vir}}{I_{upper}}(\theta_{target} - \theta_{lower} + \theta_{upper}) - \frac{c_{vir}}{I_{upper}}(\dot{\theta}_{lower} + \dot{\theta}_{upper})$$

wherein:
$k_{vir}$ is a virtual spring constant; $c_{vir}$ is a virtual damping coefficient;
$I_{upper}$ is steering column inertia; $\theta_{upper}$ is the angle of the upper steering column;
$\dot{\theta}_{upper}$ is the angular velocity of the upper steering column;
$\theta_{lower}$ is the angle of the lower steering column; and
$\dot{\theta}_{lower}$ is the angular velocity of the lower steering column.

9. A method for generating haptic feel torque for a steering system for an automotive vehicle, the method comprising:
inputting a steering command signal by manipulating a steering wheel mounted to a steering column of the automotive vehicle;
in response to the steering command, changing an orientation of road wheels of the automotive vehicle;
communicating condition data of the road wheels to a controller;
calculating with the controller a turning acceleration of the steering column in response to changing the orientation of the road wheels by modeling system components from standard steering tests and by estimating selected parameters of the steering system; and
applying the turning acceleration to the steering column.

10. The method of claim 9 wherein the vehicle includes a steering angle sensor, a motor, and a road wheel sensor, and wherein the method comprises:
identifying the steering command with the steering angle sensor;
communicating the steering command from the steering angle sensor to the motor, wherein the motor changes the orientation of road wheels of the automotive vehicle; and
obtaining the condition data of the road wheels with the road wheel sensor.

11. The method of claim 10 wherein the vehicle includes an element mechanically coupled to the road wheels, and wherein the motor changes the orientation of road wheels of the automotive vehicle by laterally displacing the element.

12. The method of claim 9 wherein the vehicle includes a haptic generator coupled to the steering column, wherein the haptic generator is directed by the controller to apply the turning acceleration to the steering column.

13. The method of claim 9 wherein the vehicle includes a haptic generator coupled to the steering column via a belt and pulley mechanism, wherein the haptic generator is directed by the controller to apply the turning acceleration to the steering column through the belt and pulley mechanism.

14. The method of claim 9 wherein the selected parameters of the steering system include $I_{equ}$, $c_{equ}$ and $k_{equ}$.

15. The method of claim 9 wherein the selected parameters are estimated by approximating the selected parameters in a second order equivalent system.

16. The method of claim 9 wherein the selected parameters are approximated in the equation:

$$T_{haptic}=I_{equ}\ddot{\theta}+c_{equ}\dot{\theta}+k_{equ}\theta+T_{EPS}+T_{SelfAlign}$$

wherein $T_{haptic}$ is the calculated steering column torque, and $I_{equ}$, $c_{equ}$ and $k_{equ}$ are determined from experimental data sets.

17. The method of claim 9 wherein the selected parameters are approximated in the equation:

$$T_{haptic}=I_{equ}\ddot{\theta}+c_{equ}\dot{\theta}+k_{equ}\theta+T_{EPS}+T_{SelfAlign}$$

wherein $T_{haptic}$ is the calculated steering column torque, and $I_{equ}$, $c_{equ}$ and $k_{equ}$ are determined from experimental data sets; and wherein $\theta_1$, $\dot{\theta}_1$, and $\ddot{\theta}_1$ are measurements of the steering wheel or road wheels.

18. The method of claim 9 wherein a first equation for calculating the turning acceleration of the steering column is used at low speeds and a second equation for calculating the turning acceleration of the steering column is used at high speeds.

19. The method of claim 9 wherein a selected equation for calculating the turning acceleration of the steering column is used at a selected vehicle speed.

20. A steering system for an automotive vehicle that includes road wheels and an element mechanically coupled to the road wheels and displaceable to change an orientation of the road wheels, the steering system comprising:
 a steering wheel mounted on a steering column and rotatable for inputting a steering command;
 a steering angle sensor for identifying the steering command;
 a motor for displacing the element to change the orientation of the road wheels;
 a road wheel sensor for obtaining road wheel condition data;
 a haptic generator coupled to the steering column for applying a turning acceleration thereto; and
 a controller for receiving the steering command data and the road wheel condition data and for calculating the turning acceleration to be applied to the steering column by modeling a virtual spring and a virtual damper interconnected between the steering column and the road wheels based on the condition data or by modeling system components from standard steering tests and by estimating selected parameters of the steering system.

* * * * *